Nov. 8, 1955 C. L. ISBORN 2,723,354

FERRO-RESONANT SHIFT REGISTER

Filed Sept. 28, 1954

INVENTOR:
Carl L. Isborn
Earl Reust
By Louis A Kline
John J. Matlago, Agent
His Attorneys 2,723,354
Patented Nov. 8, 1955

2,723,354

FERRO-RESONANT SHIFT REGISTER

Carl L. Isborn, Richmond, Calif., assignor to The National Cash Register Company, Dayton, Ohio, a corporation of Maryland Application September 28, 1954, Serial No. 458,842

7 Claims. (Cl. 307—88)

This invention relates to shift register circuits and more particularly to a ferro-resonant type shift register utilizing high reliability components throughout.

Saturable core devices provide highly durable components for electronic circuits, useful in digital computers, for example. Inasmuch as they contain no fragile parts, these devices are extremely rugged, and their maintenance is comparable to that of a conventional transformer. Furthermore, the power requirement of such devices is relatively low and they can be operated in an enclosed area without utilization of supplementary cooling means. Thus saturable core devices provide the basis for the solution of an important problem in the design of digital computer circuits, i. e., that of how to effectively reduce size and power requirements while still maintaining a high degree of reliability and durability.

Briefly, the invention herein disclosed utilizes a plurality of stages of gated double-input ferro-resonant flip-flop circuits interconnected so as to form a shift register. The gating device utilized herein is a non-linear resistor. Such non-linear resistors may be manufactured from a resistance material known as "thyrite." When a voltage is applied across this resistive material, the value of the resulting current is proportional to some power of the value of this applied voltage. Consequently it is possible to effectively control the gating of a large current through such a non-linear resistor by a small change in value of the applied voltage.

In the present invention, each ferro-resonant flip-flop includes two parallel conduction paths, only one of which can be highly conducting at a given time. A non-linear, saturable core inductor and a series capacitor are included in each path. The two paths are connected across an A. C. voltage source by way of a common impedance. Triggering means is associated with the saturable core inductor of each path. When one path is in a relatively high conducting state, a trigger pulse (of either positive or negative polarity) applied to the relatively low conducting path will flip the circuit to its opposite state. This arrangement of a flip-flop circuit has been disclosed in a copending Isborn application, Serial No. 175,784, filed July 25, 1950. The circuit of the present invention represents an improvement mainly in the manner whereby the output of each path in a given stage of a shift register is coupled to a non-linear resistor included in the trigger input of a corresponding path in an immediately following stage. Thus the relatively high voltage status in one path of a given stage increases the voltage applied to the non-linear resistor connected to the trigger input of the following stage so that, upon receipt of the next shift pulse to the shift register, this following stage will duplicate the conduction status of the given stage.

Among the objects of this invention are:

To provide a shift register in which a relatively small number of high reliability components are utilized.

To provide a shift register having low power requirements.

To provide rugged, reliable means for information recirculation.

To provide a shift register in which no diodes or electron tubes are required.

To provide a shift register effecting but little heat generation.

These and other objects of this invention, as well as other features thereof, will become more apparent to those skilled in the art by reference to the following detailed description and the accompanying drawings in which.

Figure 1:
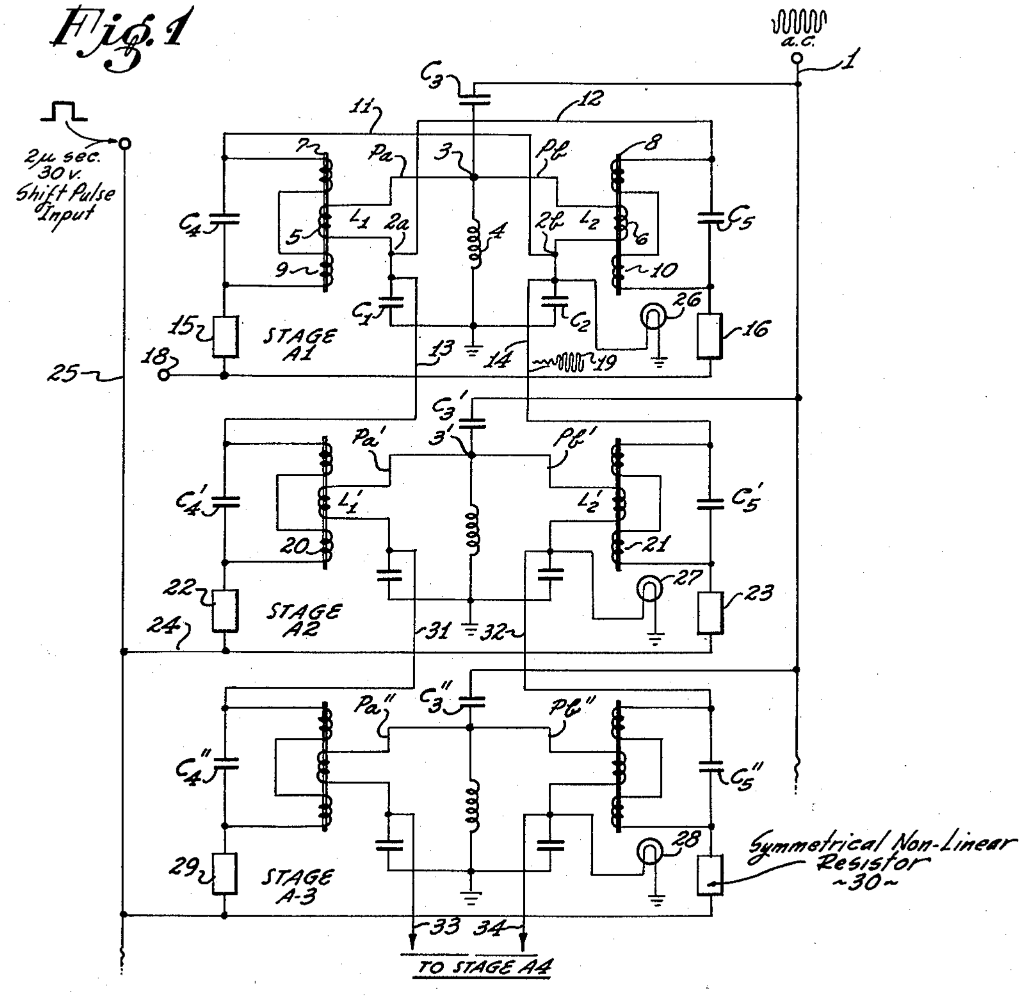
Fig. 1 is a schematic diagram of a preferred embodiment of the invention.

Reference is first made to Fig. 1 where a preferred embodiment of this invention is presented. For simplicity, only three stages of a multi-stage shift register are shown. These stages, designated A1, A2, and A3, respectively, are each comprised of a ferro-resonant flip-flop circuit. Inasmuch as the basic circuits of the three stages are similar, only stage A1 will be particularly described. Note that corresponding components of stage A2 bear like reference designations with a prime, while those of stage A3 are distinguished by a double prime.

Stage A1 includes two ferro-resonant paths, P*a* and P*b*. Path P*a* includes an inductor $L_1$ in series with a capacitor $C_1$ and path P*b* includes an inductor $L_2$ in series with a capacitor $C_2$. The inductor ends of paths P*a* and P*b* are joined at junction 3 which is connected through a capacitor $C_3$ to voltage supply lead 1 of a low impedance A. C. source. An R. F. choke 4 provides a D. C. return to ground for junction 3.

Inductors $L_1$ and $L_2$ are comprised of windings 5 and 6 about cores 7 and 8, respectively. These cores are preferably formed by rolling a thin sheet of ferromagnetic material into a tube having a length-to-diameter ratio on the order of 10 to 1. Capacitors $C_1$ and $C_2$ are returned to ground by way of the A. C. source.

Each of the LC paths of the flip-flop has an inherent bistable operation according to the principle of ferro-resonance. The bistability of path P*a*, for example, as connected between junction 3 and ground, can be explained by referring to Fig. 2. The iron core 7 of inductor $L_1$ causes the reactance of the inductor $L_1$ to vary as a function of current therethrough. The reactance of capacitor $C_1$, on the other hand, is fixed and its value is so chosen with relation to that of the inductor $L_1$ that the passing of a small amount of current through path P*a* results in the net reactance being inductive. As more current is passed through the iron core inductor $L_1$, the inductive reactance of the circuit decreases until the point indicated $I_R$ is reached. A further increase of current causes the iron core to suffer A. C. saturation which results in a still further reduction of the effective inductive reactance of inductor $L_1$. This variation of net reactance with current can be shown to be regenerative for a predetermined operating voltage applied across the LC path such that the current can be made to jump between a stable operating point characterized by the net reactance being inductive, and a stable operating point characterized by the net reactance being slightly capacitive.

Figure 2:
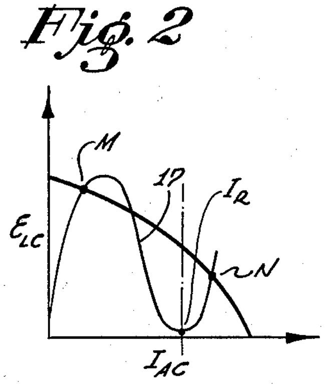
Fig. 2 is a graph for explaining the theory of operation of each of the ferro-resonant paths of the flip-flop circuits used in the invention.

As the A. C. voltage is increased, the voltage $E_{LC}$ across the LC path will first rise, reach a maximum then decrease to a minimum at a current value $I_R$. A further increase of the current beyond $I_R$ causes the voltage $E_{LC}$ to again rise. It is to be noted that the slope 17 represents a negative impedance region wherein circuit operation is unstable. But if the proper operating voltage is chosen and if the internal resistance of the circuit is relatively small, the LC path can be so operated that it will exhibit two possible stable values of $I_{AC}$, as shown in the graph of Fig. 2. Operating point M on the graph is characterized by relatively low current and high inductive reactance; and operating point N is characterized by relatively high current and a slightly capacitive reactance.

The function of common coupling capacitor $C_3$ is to ensure that only one of the two parallel conduction paths P*a* and P*b* has a relatively high current therethrough. If paths P*a* and P*b* should both tend toward a relatively low conducting state, the voltage at junction 3 rises; this relatively high voltage at junction 3 thus insures that one path assumes a relatively high conducting state. On the other hand, if the paths P*a* and P*b* should both tend toward a relatively high conducting state, the voltage at junction 3 would fall so low that neither path would have sufficient voltage across it to maintain this condition.

In order to provide means for circuit triggering, input trigger winding 9 is wound about core 7 of inductor $L_1$ and a similar input trigger winding 10 is wound about core 8 of inductor $L_2$.

Assume, for purposes of explanation, that path P*a* is in stable state N (Fig. 2), i. e., relatively high current, and that path P*b* is in stable state M (Fig. 2), i. e., relatively low current. If a trigger pulse is now applied to trigger coil 10, there is a tendency to saturate core 8 with magnetic flux lines. It is to be noted that the polarity of a triggering pulse is immaterial in achieving the foregoing result. As a result of this increased flux in core 8, the effective inductance of inductor $L_2$ decreases and path P*b* flips to a stable state defined by point N on the graph of Fig. 2; simultaneously, path P*a* flips to a stable state defined by point M on the graph of Fig. 2. The circuit is now in its opposite stable state and will remain there until a trigger pulse, either of positive or negative polarity, is applied to trigger coil 9 of path P*a*; then the current in this latter path jumps up to stable state N (Fig. 2) where it will remain until a subsequent trigger pulse is applied to trigger winding 10 of path P*b*.

In operation, left and right output leads 13 and 14, respectively, of the flip-flop circuit have an A. C. voltage output impressed thereon whose amplitude varies in accordance with current in paths P*a* and P*b*, respectively. The nature of this output is shown by the A. C. wave pattern 19 on right output lead 14.

It is notable that a double input flip-flop, by utilization of suitable directive circuits, can be made into a gated single input flip-flop. The flip-flop comprising stage A1 is, in effect, such a flip-flop because the ends of trigger windings 9 and 10 are connected through symmetrical non-linear resistors 15 and 16 to a common input terminal 18 which can be connected to a source of digital information; the other end of each trigger winding is cross-coupled to a junction point between the inductor and capacitor in the opposite conduction path, i. e., trigger winding 9 is connected to junction 2*b* and trigger winding 10 is connected to junction 2*a*, by way of leads 11 and 12, respectively.

Figure 3:
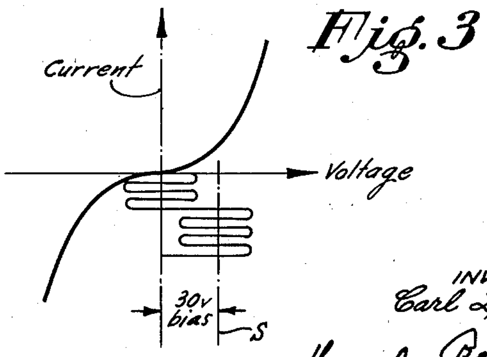
Fig. 3 is a graph showing the operating characteristics of a symmetrical non-linear resistor which enable it to function as a gate.

Referring to Fig. 3, which is a graph illustrative of current variation in a symmetrical non-linear resistor as a function of applied voltage thereto, it can be noted that current in a non-linear resistor is proportional to some power of the applied voltage. Study of Fig. 3 will reveal that matched symmetrical non-linear resistors, such as resistors 22 and 23 in Fig. 1, for example, function essentially as gates, i. e., they pass substantial current only when a sufficient amount of voltage is applied across them. It is this operational feature of the symmetrical non-linear resistor which provides the basis for operation of this invention.

Assume that stage A1 is operating such that path P*a* is initially highly conducting. A D. C. current trigger pulse on input terminal 18 will be passed by the non-linear resistor 16 having the larger voltage difference across it, i. e., since path P*a* is initially passing relatively high current, then the output voltage on line 12 applied across non-linear resistor 16 will be greater than the output voltage on line 11 appearing across non-linear resistor 15. Consequently any additional voltage such as a voltage pulse from input terminal 18 will be passed by non-linear resistor 16 and simultaneously be inhibited by non-linear resistor 15. Therefore, the flip-flop will be triggered to its other status, i. e., path P*b* relatively high, for reasons previously discussed.

The present invention lies in a novel shift register comprised of the combination of ferro-resonant flip-flop circuits interconnected as shown in the schematic diagram of Fig. 1, i. e., the output of each flip-flop stage is connected to the input of the succeeding flip-flop stage in such a way that with each shift pulse every stage, following the first stage, is forced to assume the conduction status of the stage that immediately precedes it. Explanation will now be directed toward showing how the foregoing result is achieved.

Reference to Fig. 1 will reveal that the two output leads 13 and 14 from flip-flop stage A1 are connected directly to input trigger windings 20 and 21 of flip-flop stage A2. It is to be noted that trigger windings 20 and 21 are each shunted by a capacitor $C_4'$ and $C_5'$, respectively, and are connected by way of matched non-linear resistors 22 and 23, respectively, to input lead 24 which is connected, in turn, to shift pulse input lead 25. The function of capacitors $C_4'$ and $C_5'$ in circuit triggering will be explained later, after discussion of the gating action of matched non-linear resistors 22 and 23.

Consider now how binary information introduced into first stage A1 by a trigger pulse applied to input terminal 18 can be shifted to succeeding stages of the register under control of shift pulses applied to common input lead 25. For purposes of explanation, assume that, when relatively high current exists in path P*b* of stage A1, the flip-flop is storing a "one" and when relatively high current exists in path P*a*, the flip-flop is storing a "zero." The conducting status of paths P*a'* and P*b'* of stage A2, and paths P*a''* and P*b''* of stage A3, etc. are similarly interpreted.

In order to visually indicate the binary information stored in a stage, each of the flip-flops has a light bulb connected to the path which, when lit, corresponds to a "one" status. Thus light bulb 26 is connected to path P*b* of stage A1, and light bulbs 27 and 28 are connected to paths P*b'* and P*b''* of stages A2 and A3, respectively. Assume now that stage A1 is registering a "one" therein, i. e., path P*b* is highly conducting and lamp 26 is lit; but stages A2 and A3 are both registering "zero," i. e., their paths P*a'* and P*a''* are highly conducting and lamps 27 and 28 are extinguished. Thus the stages, from top to bottom as shown in Fig. 1, are assumed to be initially registering the binary combination 100.

Symmetrical non-linear resistor 23 of stage A2 now has a relatively high voltage across it as a result of the "one" conduction status of stage A1 and the consequent relatively high voltage on output lead 14 from path P*b*. For the same reason, symmetrical non-linear resistor 22 of stage A2 simultaneously has a relatively low voltage across it, owing to relatively low voltage appearing on output lead 13 (path P*a*) of stage A1.

Similarly, symmetrical non-linear resistor 30 of stage A3 has a relatively low voltage across it as a result of the "zero" conduction status of stage A2, and the consequent relatively low voltage appearing on output lead 32 (path Pb'); while symmetrical non-linear resistor 29 in path Pa'' of stage A3 has, at this time, a relatively high voltage across it as a result of the "zero" conduction status of stage A2 and resulting relatively high voltage on output lead 31 (path Pa').

When the first shift pulse is applied to common input lead 25, the status of stage A2 is changed from "zero" to "one" while the status of stage A3 remains unchanged. Consider now the effect of this first shift pulse of, say, 2 micro-second duration and 30 volt amplitude, applied to input lead 24 of stage A2 from common input lead 25. This shift pulse is applied simultaneously to both of the matched non-linear resistors 22 and 23. The effect of the D. C. shift pulse on non-linear resistors 22 and 23 is to bias the A. C. voltage applied across them. It is notable that the polarity of the shift pulses is immaterial since, as shown in Fig. 3, non-linear resistors are symmetrical in operation; furthermore a ferro-resonant flip-flop can be triggered by either a positive or negative pulse of proper sharpness, width, and amplitude.

A positive applied shift pulse is indicated by reference line S in Fig. 3. Study of this graph will reveal that inasmuch as non-linear resistor 22 is impressed with a relatively low A. C. voltage, only a negligible amount of current is passed therethrough; but the non-linear resistor 23 is impressed with a relatively high A. C. voltage from output lead 14 of path Pb (stage A1). Consequently the first shift pulse charges by-pass condenser $C_5'$ connected in shunt with trigger winding 21 of stage A2, and energy storage within the capacitor $C_5'$ continues during the duration of the shift pulse, e. g., 2 micro-seconds. It should be noted that trigger winding 21 does not respond rapidly to increased current therethrough because of its inductance. For this reason, capacitor $C_5'$ is used in conjunction with relatively short duration shift pulses. Essentially capacitor $C_5'$ provides a shift pulse memory function or temporary storage thereof, i. e., it increases circuit triggering reliability for relatively short duration shift pulses. Of course, capacitor $C_4'$ connected in shunt with trigger winding 20 serves for stage A2 the same purpose as do capacitors $C_4$ and $C_5$ of stage A1 and capacitors $C_4''$ and $C_5''$ of stage A3.

At the termination of the first shift pulse, capacitor $C_5'$ discharges through trigger winding 21 because when capacitive elements and inductive elements are both included in a circuit, there is a tendency for the elements to exchange energy. The discharge of capacitor $C_5'$ thus effects a substantial current through trigger winding 21; consequently inductor $L_2'$ becomes nearly saturated and therefore tends to drive path Pb' toward a relatively high current condition which results in a drop in voltage at junction 3'. The current in path Pa' then starts to decrease and this trend continues resulting in a flipping of stage A2 to a "one" status.

Consider now the effect of the first shift pulse on "zero" status stage A3. The shift pulse does pass through non-linear resistor 29 owing to the relatively high A. C. voltage thereon as a result of the "zero" status of stage A2, i. e., a relatively high A. C. voltage appears on output lead 31 connected to non-linear resistor 29. But the effect is nil since the flip-flop is already in the "zero" status. Of course, the shift pulse is effectively blocked by non-linear resistor 30 owing to the relatively low A. C. voltage thereon from output lead 32 of path Pb' in stage A2.

Thus, as a result of the first shift pulse on common input lead 25, the status of register stage A2 is changed from a "zero" to "one" while the status of stage A3 remains unchanged. Assuming that the contents of stage A1 has not, in the meantime, been altered, the shift register now reads, from top to bottom, 110. It is to be noted that with this content in the stages, non-linear resistor 30, as well as non-linear resistor 23, now has a relatively high A. C. voltage across it, while non-linear resistors 22 and 29 have a relatively low A. C. voltage thereacross.

It is thus apparent that when the second shift pulse is applied on common input lead 25, the status of stage A3 is changed from a "zero" to a "one," while stage A2 remains unchanged. Thus after the termination of this second shift pulse, assuming again that the content of stage A1 has not been changed, the shift register now stores the binary combination, from top to bottom, 111. With this content in the stages, both non-linear resistor gates 22 and 29 are effectively closed owing to the relatively low A. C. voltage appearing across them from output leads 13 and 31 of stages A1 and A2, respectively.

The foregoing example of the operation of the shift register assumes that stage A1 remains in the "one" status. However, it should be clear from the above that stage A1 can be triggered into a "zero" status by a pulse on input terminal 18 occurring simultaneously with a shift pulse on input lead 25, so as to change the sequence of binary digits being shifted in the register.

The foregoing example illustrates how the shift register herein disclosed operates in accordance with the requirement that with each shift pulse, each stage takes on the former conducting status of the immediate preceding stage.

It is to be noted that the inherent delay in response for each trigger circuit arising from the LC value therein is such as to effectively nullify any spurious interstage coupling effects, i. e., during a shift pulse, energy is stored in a by-pass capacitor, but no effective changes take place in the conduction status of the associated flip-flop until the shift pulse has terminated.

The shift register described herein can be connected into a "ring" circuit if so desired. This result can be effected by connecting outputs 33 and 34 from stage A3, for example, to corresponding trigger windings 9 and 10, respectively, in stage A1. To achieve this result, trigger pulse input terminal 18 should also be connected to shift pulse input lead 25 and cross-coupling leads 11 and 12 should be disconnected. In this manner, a relatively simple and convenient means would be provided for information recirculation.

Thus a preferred embodiment of a reliable, rugged, safe, adaptable, low power requirement all magnetic component type shift register has been presented. Of course, the specific apparatus and circuits just described represent but one form of this invention and are not to be interpreted as a restriction or limitation thereof. It is apparent that modification and variations of this shift register, using other forms of bistable state circuits, for example, may occur to those skilled in the electronic art without departing from the spirit and scope of this invention as defined in the appended claims.

What is claimed is:

1. A shift register comprising a plurality of bistable state circuit stages, each including a pair of current paths; an alternating electromotive force connected across each said circuit stages such that only one of the paths thereof is capable of being in a relatively high current conducting state at a time; triggering means for each said bistable state circuit stages; a non-linear resistor connected to each said triggering means; an output from each bistable state circuit stage connected to the triggering means of the successive bistable state circuit stage; and a shift pulse source connected to said non-linear resistors, whereby in response to each shift pulse each said bistable state circuit stage is triggered to conform with the conducting status of the preceeding stage.

2. A shift register comprising a plurality of A. C. operated flip-flop stages, each said flip-flop stage including a high and low conducting ferro-resonant branch; a trigger coil associated with each ferro-resonant branch of a flip-flop stage; a symmetrical non-linear resistor connected to each said trigger coil; a shift pulse source connected to each said resistor; and means for connecting an output from each branch in a flip-flop stage across the trigger coil of a corresponding branch in the following flip-flop stage, whereby in response to a shift pulse from said source, each flip-flop stage duplicates the conducting status of the preceeding stage.

3. A shifting register comprising a plurality of flip-flop stages, each including a pair of ferro-resonant paths; an alternating electromotive force connected across said paths so that only one of said paths is capable of being in a relatively high conducting state at a time; a triggering means associated with each said path; a non-linear resistor connected to each said triggering means; an output from each path of a flip-flop being connected to triggering means in the corresponding path of a successive flip-flop; and a shift pulse source connected to each said non-linear resistor, whereby in response to a shift pulse each flip-flop stage duplicates the conducting status of the immediate preceeding stage.

4. A shift register comprising a plurality of flip-flop stages, each said flip-flop stage including a pair of ferro-resonant branches; a trigger coil associated with each ferro-resonant branch of a flip-flop stage; a symmetrical non-linear input resistor connected to each said trigger coil; means for connecting an output from each branch in a flip-flop stage across the trigger coil of a corresponding branch in the following flip-flop stage; means for further connecting the output of each branch of the first flip-flop stage across the trigger coil of the opposite branch thereof; an input source connected to the input resistors of said first flip-flop stage; and a shift pulse source connected to the input resistors of the remaining flip-flop stages, whereby each said flip-flop stage is triggered to correspond with the status of the previous stage in response to shift pulses from said source.

5. A shift register comprising a plurality of flip-flop stages, each said flip-flop including a pair of ferro-resonant branches, each said branch including a non-linear inductor having a capacitor in series therewith; a trigger coil associated with each said non-linear inductor; a capacitor shunted across each said trigger coil; an alternating voltage connected across each said flip-flop by way of a common impedance so that only one of the branches thereof is in a relatively high conducting state at a time; an output from each said flip-flop stage connected to the trigger coil associated with the branch of the succeeding flip-flop stage; a non-linear resistor connected to each trigger coil; and a shift pulse source connected to each said non-linear resistor, whereby the conducting status of each stage affects the voltage bias on the non-linear resistor connected to the trigger coil of the next successive stage so that in response to each said shift pulse the conducting status of each stage is shifted to the succeeding stage.

6. A shift register comprising a plurality of flip-flop stages, each said flip-flop stage including a pair of ferro-resonant branches, each said branch including a non-linear inductor and a capacitor in series therewith; a trigger coil associated with each said non-linear inductor; a capacitor connected across each said trigger coil; means for connecting an alternating voltage across each said flip-flop stage such that only one branch thereof is in a relatively high conducting state at a time; a shift pulse source; gating means connecting said shift pulse source to each said trigger coil; an output from each branch of a flip-flop stage; and means connecting the outputs of each flip-flop stage to control the gating means connected to the trigger coil of the corresponding branch in the following flip-flop stage, whereby each said flip-flop stage duplicates the conducting status of the immediate preceeding stage in response to a shift pulse from said source.

7. A shift register comprising a plurality of flip-flop stages, each said flip-flop stage including a pair of ferro-resonant branches, each said branch including a non-linear inductor and a capacitor in series therewith; a trigger coil associated with each said non-linear inductor; a capacitor connected across each said trigger coil; means for connecting an alternating voltage across each said flip-flop stage such that only one branch thereof is in a relatively high conducting state at a time; a non-linear resistor connected to each said trigger coil; a shift pulse source connected to each said non-linear resistor; an output from each branch of a flip-flop stage; and means connecting the output of each flip-flop stage to the trigger coil of a corresponding branch in the following flip-flop stage, whereby each said flip-flop stage duplicates the conducting status of the immediate preceeding stage in response to a shift pulse from said source.

No references cited.